United States Patent Office 3,558,479
Patented Jan. 26, 1971

3,558,479
LOW PRESSURE REGENERATIVE REFORMING PROCESS FOR HIGH PARAFFIN FEEDS
Robert L. Jacobson, Pinole, and Robert D. Vanselow, Kensington, Calif., assignors to Chevron Research Company, San Francisco, Calif., a corporation of Delaware
No Drawing. Continuation-in-part of application Ser. No. 740,566, June 27, 1968. This application June 16, 1969, Ser. No. 833,777
Int. Cl. C10g 35/08
U.S. Cl. 208—139                                    9 Claims

ABSTRACT OF THE DISCLOSURE

A naphtha feed containing at least 50 volume percent paraffins is reformed to high octane gasoline products at a pressure less than about 100 p.s.i.g. in the presence of hydrogen with a catalyst comprising from 0.01 to 3 weight percent platinum and 0.01 to 5 weight percent rhenium associated with a porous inorganic oxide. The reforming process is periodically discontinued to permit regeneration of the catalyst to restore substantially its initial activity.

CROSS-REFERENCE

This application is a continuation-in-part of application Ser. No. 740,566, filed June 27, 1968.

BACKGROUND OF THE INVENTION

Field

This invention relates to hydrocarbon reforming processes. More particularly, the present invention is concerned with reforming processes conducted at low pressures, i.e., below 100 p.s.i.g., using highly paraffinic feedstocks. That is, feedstocks containing greater than 50 percent paraffins under regenerative conditions to produce high octane gasolines.

Prior art

Reforming of hydrocarbon naphtha feeds to produce high octane gasoline products has successfully been accomplished at high pressures, e.g., greater than 350 p.s.i.g., using catalysts comprising platinum on porous inorganic oxides, particularly alumina. Generally, high pressures help limit those reactions occurring during reforming which significantly affect coke formation on the catalyst, as, for example, condensation and polymerization. As a consequence, high pressure reforming processes permit long onstream periods of operation, e.g., period of several months, between replacement and/or regeneration of the catalyst. However, there are disadvantages to high pressure reforming. At high pressures, reactions which adversely affect the yield of valuable $C_5+$ products are more prevalent, compared to lower pressures. Thus, at high pressures, where significant amounts of hydrogen are present, hydrocracking reactions are favored, thus leading to production of light, less valuable, gases. Furthermore, high pressures, particularly when coupled with high hydrogen levels, are not favorable for dehydrocyclization and dehydrogenation reactions, both of which are important upgrading reactions for producing high octane gasoline.

Certainly there is sufficient incentive for very low pressure reforming, e.g., increased yields. Thus, significant effort has been expended by the petroleum industry to develop suitable low pressure reforming processes, i.e., processes which operate at pressures below 350 p.s.i.g. However, there are many problems involved in low pressure reforming. For example, as the pressure in the reaction zone is lowered, the rate of catalyst fouling generally increases significantly; thus, it becomes necessary to re- generate the catalyst more frequently. In order to help control catalyst deactivation at the low pressures, high hydrogen to hydrocarbon mole ratios are generally considered necessary. However, high hydrogen to hydrocarbon mole ratios at low pressures create problems arising from handling large volumes of hydrogen. Thus, at low pressures and high hydrogen to hydrocarbon mole ratios, large compressors and pipes, etc., must be used in order to accommodate the large volumes of hydrogen.

While many low pressure reforming processes have been developed and are now commercially available, such low pressure processes are generally operated at reactor pressures of from 100 to 300 p.s.i.g., and preferably at about 200 p.s.i.g. Furthermore, to curtail as far as possible undesirable catalyst fouling reactions, these low pressure processes generally use relatively high hydrogen to hydrocarbon mole ratios, e.g., of the order 4–6. Even then, such processes operate for short onstream times between regenerations, i.e., of the order of 24 to 48 hours. Processes using pressures lower than about 100 p.s.i.g. and hydrogen to hydrocarbon mole ratios lower than about 4 and particularly lower than about 2 have not been commercially attractive because of the high rate of catalyst deactivation.

SUMMARY OF THE INVENTION

A low pressure reforming process has now been developed which permits the production of high octane gasoline in high yields from highly paraffinic feedstocks. The low pressure reforming process is conducted at an average reactor pressure of less than about 100 p.s.i.g., preferably 20 to 100 p.s.i.g., and at a hydrogen to hydrocarbon mole ratio preferably less than about 4, using a catalyst comprising a porous inorganic oxide in association with from 0.01 to 3 weight percent platinum, 0.01 to 5 weight percent rhenium and 0.1 to 3 weight percent halide, to produce a gasoline product of at least 90 F–1 clear octane. The process is considered regenerative in the sense that the onstream period between regeneration of the catalyst is usually of the order of several hundred hours or less rather than several months, as is the case with nonregenerative systems. Thus, it is generally preferred to regenerate the catalyst at least every 500 hours, and preferably at least every 300 hours. As a preferred embodiment, the catalyst is regenerated at least every 24 hours. The low pressure permits high yields of high octane gasoline to be produced.

It has been unexpectedly found that low pressure reforming of highly paraffinic stocks with the platinum-rhenium catalyst results in exceptionally high yields of $C_5+$ gasoline product, and particularly high yields of aromatic product as compared to reforming of a highly paraffinic feedstock at a higher pressure, e.g., 250 p.s.i.g. Reforming of a more conventional feedstock, e.g., a feedstock containing less than 50 volume percent paraffins at low pressure, e.g., 100 p.s.i.g. with the platinum-rhenum catalyst results in only a small improvement in the yield of $C_5+$ gasoline as compared to reforming of the same feed at a higher pressure, e.g., 200 p.s.i.g. Thus reforming a highly paraffinic feedstock at a low pressure in accordance with the process of the present invention results in a significant advance in the reforming art.

The process of the present invention comprises reforming a naphtha feed containing at least 50 volume percent paraffins in the presence of hydrogen in a reaction zone and at reforming conditions including a pressure of less than about 100 p.s.i.g., a hydrogen to hydrocarbon mole ratio preferably less than 4, in the presence of a catalyst comprising a porous inroganic oxide carrier associated with from 0.01 to 3 weight percent platinum, from 0.01 to 5 weight percent rhenium and from 0.1 to 3 weight percent halide. The contact of feed with the catalyst is periodically discontinued and the catalyst regenerated to restore substantially the initial activity. Then the feed is again contacted with the catalyst at reforming conditions as above described.

DESCRIPTION OF THE INVENTION

In general, commercially available low pressure regenerative systems using platinum-containing catalysts are not operated at pressures below 100 p.s.i.g. Generally, the pressures used in the petroleum industry for low pressure regenerative systems are above 100 p.s.i.g. and preferably about 200 p.s.i.g. In the process of the present invention the pressure is preferably less than 100 p.s.i.g. and generally from 20 to 100 p.s.i.g. More preferably, the pressure is from 40 to 100 p.s.i.g., and most preferably from 40 to 80 p.s.i.g. The pressure is determined as the average reactor pressure. Thus, for example, in a process where several reactors are in series with the flow of feed from the outlet of one reactor to the inlet of the other reactor, the pressure, i.e., 20 to 100 p.s.i.g., will be the average of the pressure throughout the several reactors. When only one reactor is used the pressure will be the average pressure through that reactor.

Pressures below about 20 p.s.i.g. could be used, but in general, lower pressures are not economically feasible. At pressures below about 20 p.s.i.g., difficulty may be occasioned in circulating the feed and reformed product as well as hydrogen through the reforming system. Thus, operating at an average reactor pressure substantially below 20 p.s.i.g. would require part of the system, e.g., the separator, being under vacuum in order to provide sufficient pressure drop in the system to circulate the feed, etc. Pressures greater than 100 p.s.i.g. are not desired since then the advantages of the low reforming pressure cannot be fully realized, e.g., high yields, generally lower reforming temperatures, etc.

Reforming is generally accomplished in the presence of hydrogen. The presence of hydrogen serves to reduce coke formation on the catalyst. Furthermore, the presence of hydrogen can be used to favor certain reforming reactions. For purposes of the present invention, it is preferred that the amount of hydrogen be maintained sufficiently low so that the hydrogen to hydrocarbon mole ratio is less than about 4, and more preferably less than about 2. Hydrogen to hydrocarbon ratios of as high as 6 can be used, but the large volumes of hydrogen involved create handling problems. The "hydrocarbon" used in measuring the hydrogen to hydrocarbon mole ratio is considered to be the naphtha feed and does not include light, hydrocarbon gases which may be present in a recycle hydrogen stream. For purposes of the present invention, the hydrogen to hydrocarbon mole ratio is measured at the inlet of the reactor, and in the case of several reactors in series, at the inlet of the first reactor. Preferably, the hydrogen to hydrocarbon mole ratio will be from 0.5 to 4.

Hydrogen can be introduced from an extraneous source, e.g., pure hydrogen from bottles can be used. Thus, the hydrogen can be used only on a once-through basis. Inasmuch as reforming generally results in the production of hydrogen, hydrogen produced in the reaction can be separated from the reformate and recycled to the reaction zone. Thus, extraneous hydrogen need not necessarily be added to the reforming process. However, if desired, extraneous hydrogen can be used at some stage of the operation, as, for example, during startup. Regardless of the source of the hydrogen, the hydrogen can be introduced into the feed prior to contact with the catalyst or can be contacted simultaneously with the introduction of feed to the reaction zone. The hydrogen need not necessarily be pure hydrogen, but can contain light hydrocarbon gases in admixture therewith. Generally, when hydrogen is recirculated to the reaction zone, light hydrocarbon gases will be recirculated with the hydrogen. It is preferred that relatively pure hydrogen be used; however, difficulty and expense in purifying recycle hydrogen often prevents this from being the case.

At the very low pressures involved in the process of the present invention it may not be necessary to add hydrogen to the reaction zone, either as recycle hydrogen or as extraneous hydrogen. Reforming results in the production of hydrogen, and this hydrogen produced in the reaction zone may be sufficient to prevent rapid fouling of the catalyst. Thus, the hydrogen to hydrocarbon mole ratio would be considered effectively zero under such circumstances. However, for purposes of the present invention, it is generally preferred that the hydrogen to hydrocarbon mole ratio be at least 0.5, i.e., that some hydrogen be added to the reaction zone.

As the pressure in the reaction zone is decreased, it is preferred to decrease the hydrogen to hydrocarbon mole ratio. As previously explained, operating at low pressures presents difficulties in handling large volumes of hydrogen. The lower the pressure, the lower should be the hydrogen to hydrocarbon mole ratio. Thus, when operating at pressures of, for example, less than 50 p.s.i.g., the hydrogen to hydrocarbon mole ratio should preferably be less than about 1.

The feed rate used in the present invention, i.e., the liquid hourly space velocity (LHSV), should be from 0.5 to 5, and preferably from 1 to 3. Higher space rates than about 5 are undesirable because of the large volumes of feed involved.

The temperature of the reforming process will generally be in the range of 600° F. to 1100° F. and preferably from 750° F. to 1050° F. The temperature will be determined, generally, by the other operating conditions; that is, at a particular pressure, liquid hourly space velocity, and hydrogen to hydrocarbon mole ratio the temperature is determined by the octane number of products to be produced. Reforming at low pressures generally permits lower reforming temperatures to be used to produce a gasoline product of the desired octane rating than reforming at high pressures. This has the advantage of requiring less heating capacity in the furnaces used to heat the naphtha to reaction conditions. However, at low pressures and low hydrogen to hydrocarbon mole ratios, difficulty may be experienced in maintaining the reactor at the desired temperature to produce a product of a desired octane rating. The volume of gas, e.g., hydrogen entering the reaction zone, may not be sufficient to provide the desired heat input. Thus, it may be desirable to provide heat pipes or heating coils in the reaction zone to maintain a sufficiently high temperature for reforming. Also, an isothermal system could be used rather than the more common adiabatic processes.

The catalyst which finds use in the low pressure reforming process of the present invention comprises a porous inorganic oxide carrier or support containing from 0.01 to 3 weight percent platinum and from 0.01 to 5 weight percent rhenium and from 0.1 to 3 weight percent halide. Porous inorganic oxide carriers or supports useful in the present invention include a large number of materials with which the catalytically active amounts of platinum and rhenium can be disposed. Thus, the support can be natural or synthetically produced inorganic oxides or combination of inorganic oxides. Typical acidic inorganic oxides which can be used are the naturally occurring aluminum silicates, particularly when acid treated to increase the activity, and the synthetically produced cracking supports, such as silica-alumina, silica-zirconia, silica-alumina-zirconia, silica-magnesia, silica-alumina-magnesia, and crystalline zeolitic aluminosilicates. Generally, however, reforming processes are preferably conducted in the presence of inorganic oxides such as magnesia and alumina. These catalysts have limited acidity. The inorganic oxide supports for purposes of the present invention should be porous, i.e., have a surface area of from 50 to 700 m.$^2$/gm. and more preferably from 150 to 700 m.$^2$/gm.

Alumina is particularly preferred for purposes of this invention. Any of the forms of alumina suitable as a support for reforming catalysts can be used. Furthermore, alumina can be prepared by a variety of methods satisfactory for purposes of this invention. The preparation of alumina for use in reforming catalysts is well known in the art.

Various methods of preparation can be used for associating the platinum and rhenium with the porous inorganic oxide carrier. Platinum and rhenium can be disposed on the porous inorganic oxide in intimate admixture with each other by such suitable techniques such as ion-exchange, copreicipitation, impregnation, etc. It is not necessary that both components, platinum and rhenium, be incorporated onto the porous inorganic oxide by the same technique. Thus, one of the components can be associated with the carrier by one method such as, for example, impregnation, and the other component associated with the carrier by another technique such as, for example, coprecipitation. Furthermore, platinum and rhenium can be associated with the carrier either simultaneously or sequentially. It is generally preferred that platinum and rhenium be associated with the carrier by impregnation, either sequentially or simultaneously. In general, the carrier material is impregnated with an aqueous solution of a decomposable compound of the meal in sufficient concentration to provide the desired quantity of platinum or rhenium in the finished catalyst. To incorporate platinum on the catalyst by impregnation, chloroplatinic acid is preferred. Other platinum-containing compounds can be used, e.g., chloroplatinates and polyammineplatinum salts. Rhenium is suitably incorporated onto the carrier by impregnation with perrhenic acid. However, ammonium or potassium perrhenates among others, can also be used.

It is contemplated in the present invention that incorporation of platinum and rhenium with the carrier can be accomplished at any particular stage of the catalyst preparation. For example, if platinum and rhenium are to be incorporated onto an alumina support, the incorporation can take place while the alumina is in the gel or sol form. Alternatively, a previously prepared alumina carrier can be impregnated with a water solution of the metal compounds. Generally, the catalyst is preferably prepared by impregnating platinum and rhenium onto a previously prepared porous inorganic oxide carrier. The platinum and rhenium are desirably uniformly distributed on the surface of the carrier and are preferably in intimate admixture with each other on the support.

The platinum-rhenium catalyst should comprise platinum in an amount from 0.01 to 3 weight percent and more preferably, from 0.2 to 1 weight percent of the finished catalyst. Concentrations of platinum below about 0.01 weight percent are too low for satisfactory reforming operation. On the other hand, concentrations of platinum above about 3 weight percent are generally unsatisfactory due to the high cost of the platinum metal. The concentration of rhenium in the finished catalyst composition is preferably in the range of from 0.01 to 5 weight percent and more preferably, from about 0.01 to 2 weight percent. Higher concentrations of rhenium could be advantageously used but the cost of rhenium limits the amount attractive for use in the present invention. It is preferred that the rhenium to platinum atom ratio be from 0.1 to 2 and more preferably, that the atom ratio of rhenium to platinum not exceed 1. Regardless of the form in which the platinum and rhenium exists on the carrier, whether as metal or compound, or mixtures thereof, the weight percent is calculated as the metal.

After incorporating platinum and rhenium onto the porous inorganic oxide carrier, the resulting composite is usually dried by heating at a temperature of no greater than about 500° F. and preferably from about 200° F. to 400° F. If the components, platinum and rhenium, are sequentially incorporated onto the porous inorganic oxide support, the catalyst may be dried after the additin of the first component but before the addition of the other. Furthermore, the catalyst composite containing only one component can be calcined at an elevated temperature, e.g., up to about 1200° F., if desired, prior to incorporation of the other component. Generally, however, calcination at an elevated temperature, e.g., from 700° F. to 1200° F., is done only after both components, platinum and rhenium, have been incorporated onto the carrier and the composite dried.

Prior to using the catalyst in the low pressure process of the present invention, the composite of platinum and rhenium with the inorganic oxide carrier is preferably heated in the presence of a reducing atmosphere at an elevated temperature. Preferably, the heating is performed in the presence of hydrogen, and more preferably, in the presence of dry hydrogen. It is particularly preferred that this preheating be accomplished at a temperature in the range of from 600° to 1300° F., preferably 600° to 1000° F.

The catalyst used in the present invention preferably has a limited amount of activity. Thus, the catalyst preferably contains a halide and more preferably, a chloride or fluoride. Bromides may also be used. The halide should be present in an amount from 0.1 to 3 weight percent total halide content and preferably from 0.1 to 2 weight percent. The halide in an amount from 0.1 to 3 weight percent provides the limited amount of acidity necessary for the reforming at the low pressures and low hydrogen to hydrocarbon mole ratios. The halide can be incorporated onto the catalyst carrier at any suitable stage of catalyst manufacture, e.g., prior to or following incorporation of the platinum and rhenium. Generally, halide is incorporated onto the carrier in the process of impregnating compounds of platinum and/or rhenium onto the carrier; for example, impregnating the carrier with chloroplatinic acid normally results in chloride addition to the carrier. However, more halide may be desired, in which case additional halide can be incorporated onto the support simultaneously with the incorporation of platinum and/or rhenium or following incorporation of the platinum and/or rhenium. In general, halides are combined with the catalyst carrier by contacting suitable compounds such as hydrogen fluoride, ammonium fluoride, hydrogen chloride or ammonium chloride, using the gaseous form or a water soluble form, with the carrier. Preferably, the halide is incorporated onto the carrier from an aqueous solution containing said halide.

The feed used in the process of the present invention can be, e.g., a straight-run naphtha, a thermally-cracked naphtha, or a catalytically-cracked naphtha or blends thereof. In general, the naphtha feedstock useful in the present invention will boil in the range falling within limits of from about 70° F. to 550° F., preferably from 150° F. to 450° F. The naphtha feedstock will contain at least 50 volume percent paraffins and more preferably, at least 60 volume percent paraffins. Paraffins include straight-chain and branched-chain saturated hydrocarbons, as, for example, normal heptane, isoheptane, hexane, octane, etc. Generally, the naphtha feedstocks useful in the process of the present invention will contain from 50 to 70 volume percent paraffins. Completely paraffinic feedstocks can be used but generally feedstocks will contain no more than about 90 volume percent paraffins. The remainder of the feedstock will consist essentially of naphthenes and aromatics.

The feed used should preferably be substantially sulfur free, that is, the feed should preferably contain less than about 10 p.p.m. sulfur, more preferably less than 5 p.p.m., and still more preferably, less than 1 p.p.m. Sulfur has a detrimental effect upon the stability of the catalyst. It is recognized that in processes where a recycle hydrogen stream is used, sulfur may build up in the recycle hydrogen stream; that is, sulfur entering the reforming system in the naphtha feed may not necessarily be entirely scrubbed from the products or bled from the recycle stream, but may be allowed to recycle with the hydrogen-rich gas to the reforming reaction zone. However, the amount of sulfur which can build up in the recycle stream is, in general, limited by the amount of sulfur in the feed.

In the case of a feedstock which is not already low in sulfur, acceptable levels can be reached by hydrogenating the feedstock in a presaturation zone, e.g., hydrodesulfurization zone, wherein the naphtha is contacted with a hydrogenation catalyst which is resistant to sulfur poisoning. A suitable hydrodesulfurization catalyst comprises, for example, an alumina-containing support and a minor proportion of molybdenum oxide and cobalt oxide. Hydrodesulfurization conditions normally include a temperature from 600° F. to 850° F., a pressure from 200 to 2000 p.s.i.g., and a liquid hourly space velocity from 1 to 5. The sulfur contained in the naphtha is converted to hydrogen sulfide which can be removed prior to reforming. Suitable conventional processes can be used to remove the hydrogen sulfide.

Reforming at low pressures and low hydrogen to hydrocarbon mole ratios requires periodic regeneration of the catalyst. Thus, the reforming system used in the present invention should provide for frequent regeneration in order to obtain long overall run lengths. A variety of well-known regenerative systems are applicable to the process of the present invention. Thus, the process of the present invention can be used in a fluidized reforming system wherein the catalyst is continuously circulated between a reforming zone and a regeneration zone. The reforming process of the present invention can also be used in fixed bed systems wherein the catalyst is disposed in a plurality of reactors which are connected in series to allow for flow of feed from the outlet of one reactor to the inlet of the next reactor and in which each reactor is capable of being removed or isolated from the system and regenerated without discontinuing the flow of feed throughout the other reactors. Thus, regenerative fixed bed systems provided with swing reactors or shift reactors as disclosed in the prior art can be used. Other prior art processes, as, for example, regenerative moving bed processes can also be used.

In a reactor system wherein several reactors are in series, the catalyst in the end or tail reactors will generally be regenerated more frequently than the front reactors. Thus, the tail reactor of a four-reactor system may be offstream, and the catalyst therein undergoing regeneration 50 percent of the total time spent in regeneration of the catalyst in the several reactors, whereas the front reactor may be regenerated only 10 percent of the time. The front reactors may thus operate for several hundred hours before regeneration whereas the tail reactors might only operate 20 to 100 hours before regeneration. In a reforming system comprising a plurality of reactors in series, it is preferred to regenerate the tail reactors at least every 24 hours.

The regeneration time should preferably be short in comparison to the overall reforming time. Thus, it is preferred that the regeneration time be less than about 20 percent of the onstream reforming time. When several reactors are in series, the average time for regeneration for the catalyst in all the reaction zones preferably should not exceed 20 percent of the average onstream reforming time. At the low pressures of, e.g., 20 to 50 p.s.i.g., catalyst fouling will be faster and hence regeneration will be more frequent than at higher pressures, e.g., above 50 p.s.i.g. However, in general, the regeneration time will normally be about the same regardless of the pressure at which the reforming process is conducted.

The catalyst is regenerated by heating at combustion temperatures in the presence of an oxidizing gas, e.g., oxygen. The oxygen should preferably be present in a limited amount, e.g., less than about 5 volume percent of the regeneration gas and preferably less than about 2 volume percent of the regeneration gas. The rest of the gas should preferably be an inert gas, e.g., nitrogen. The presence of high amounts of oxygen could result in a temperature runaway in the regeneration step. Preferably the inert gas, e.g., flue gas, nitrogen, etc., containing oxygen is passed over the bed of catalyst at an initial temperature of from, e.g., 700° F. to 900° F. to produce a flame front or combustion zone which travels through the catalyst bed. The amount of oxygen in the introduced gas is controlled to prevent the combustion front from exceeding about 1250° F. and is preferably controlled to prevent the combustion front from exceeding 1000° to 1100° F. The regeneration may take place in steps; that is, an initial combustion can be accomplished at a temperature, e.g., less than 800° F. than a further combustion at a higher temperature, e.g., less than 900° F. Halide, e.g., chloride, may be added to the catalyst during the regeneration process in order to provide the regenerated catalyst with a halide content of a particular amount. The chloride or another halide may be added to the catalyst before or after the carbon burnoff. Many variations of the regeneration procedures described above can be made.

Following regeneration of the catalyst, the system is purged with nitrogen or other inert gas to remove any oxygen present and then the catalyst is contacted with hydrogen at an elevated temperature. Thereafter, the naphtha and hydrogen are contacted with the catalyst, preferably under the reforming conditions used initially. Preferably the regeneration of the catalyst is done at temperatures and pressures near those used in the reforming process.

The reforming conditions of the present process should be sufficiently severe to produce at least 90 F-1 clear octane gasoline and preferably at least 95 F-1 clear octane gasoline. As a preferred embodiment of the present invention, the gasoline product produced should be of at least 100 F-1 clear octane. The unexpected increase in yield of $C_5+$ gasoline product is particularly realized when the octane number of the product produced is greater than about 90 F-1 clear. In reforming highly paraffinic feedstocks at low severity, that is, at conditions which would produce gasoline of less than 90 F-1 clear octane, the differences in yield of $C_5+$ gasoline produced at low pressure, that is, less than 100 p.s.i.g., and high pressure, that is, greater than 100 p.s.i.g., are not as significant. The octane number of the product is a relative indication of the conversion of paraffins to cyclic compounds, for example, aromatics. The higher the octane number of the product the greater the extent of dehydrocyclization of paraffins to aromatics.

The present invention may be better understood with reference to the following example.

EXAMPLE

A catalyst comprising 0.6 weight percent platinum and 0.6 weight percent rhenium in association with an alumina carrier and containing 0.6 weight percent chloride was used in reforming a highly paraffinic naphtha at two conditions of pressure. The highly paraffinic naphtha feedstock had a boiling range from 250° F. to 365° F. The paraffin content of the feed was 66.1 volume percent; the naphthene content was 22.7 volume percent; and the aromatic content was 11.1 volume percent. The octane rating of the feed was 27.5 F-1 clear. For one operation, the pressure was 250 p.s.i.g. For the other operation, the pressure was 60 p.s.i.g. For both processes the liquid hourly space velocity (LHSV) was 1.2 and the hydrogen to hydrocarbon mole ratio was 6. The temperature was adjusted in order to maintain a product having an F-1 clear octane rating of approximately 105.

The results of the two reforming processes using the highly paraffinic feed are tabulated in Table I.

TABLE I

|  | Pressure, p.s.i.g. | |
| --- | --- | --- |
|  | 250 | 60 |
| Product Octane, F-1 clear | 105.9 | 104.7 |
| Yields: |  |  |
| $C_5+$, volume percent | 61.8 | 74.0 |
| $H_2$, s.c.f./bbl. feed | 1,140 | 1,900 |
| $C_1-C_3$, s.c.f./bbl. feed | 700 | 285 |
| $C_4$'s, volume percent | 9.8 | 3.5 |
| Composition, volume percent: |  |  |
| Paraffins | 7.2 | 9.7 |
| Naphthenes | 0.2 | 1.2 |
| Aromatics | 91.7 | 88.2 |
| Olefins | 0.9 | 0.9 |
| Total cyclic compounds, volume percent based on feed | 56.8 | 67.6 |

As is noted from Table I, dropping the pressure from 250 to 60 p.s.i.g. resulted in a significant increase in the $C_5+$ liquid yield, from 61.8 volume percent to 74.0 volume percent. Furthermore, the hydrogen produced increased dramatically, from 1140 s.c.f./bbl. feed to 1900 s.c.f./bbl. feed. Significantly, fewer $C_1-C_4$ hydrocarbons were produced at the lower pressure. The total cyclic compounds based on the feed were significantly higher for the 60 p.s.i.g. run than the 250 p.s.i.g. run. It was entirely unexpected that the yield would increase so dramatically as a result of a decrease in reforming pressure.

A catalyst comprising 0.3 weight percent platinum, 0.3 weight percent rhenium, and 0.6 weight percent chloride associated with an alumina carrier was used in reforming a more conventional naphtha, that is, a naphtha containing less than about 50 volume percent paraffins. The naphtha boiled within the range from 200 to 365° F. and contained 36.3 volume percent paraffins, 59.0 volume percent naphthenes, and 4.7 volume percent aromatics. The F-1 clear octane rating of the feed was 60. Reforming processes were conducted at a pressure of 200 p.s.i.g. and a pressure of 100 p.s.i.g. The reforming conditions for both runs included a liquid hourly space velocity (LHSV) of 1.5-2.0, and a hydrogen to hydrocarbon mole ratio of 6. The temperature of the catalyst was adjusted throughout the run to maintain production of about 104 F-1 clear octane product.

The results of the two reforming runs are tabulated in Table II.

TABLE II

|  | Pressure, p.s.i.g. | |
| --- | --- | --- |
|  | 200 | 100 |
| Product Octane, F-1 clear | 104.2 | 104.1 |
| Yields: |  |  |
| $C_5+$, volume percent | 77.1 | 79.6 |
| $H_2$, s.c.f./bbl. feed | 1,800 | 1,880 |
| $C_1-C_3$, s.c.f./bbl. | 280 | 220 |
| Composition, volume percent: |  |  |
| Paraffins | 15 | 15.5 |
| Naphthenes | 2.6 | 3.5 |
| Aromatics | 82.4 | 81.0 |
| Total cyclic compounds, volume percent based on feed | 63.5 | 64.5 |

In the reforming of the less paraffinic feed, a decrease in the pressure from 200 p.s.i.g. to 100 p.s.i.g. resulted in only a small increase in $C_5+$ liquid product. Thus, the $C_5+$ liquid product increased from 77.1 to 79.6 volume percent. This degree of increase, while still representing a substantial savings for a commercial unit, is small in comparison with the increase in yield realized from lowering the pressure of reforming for the paraffinic feedstock.

While the hydrogen to hydrocarbon mole ratio was 6 in the above example, it is generally preferred to maintain the ratio less than about 4 in order to cut down on the large volume of hydrogen requiring handling.

The use of a platinum-rhenium catalyst permits reforming operation at very low pressures without excessive fouling, as shown in application Ser. No. 740,566, filed June 27, 1968, which is incorporated herein by reference thereto. The use of the platinum-rhenium catalyst for reforming operation at very low pressures without excessive foulfeeds containing greater than 50 volume percent paraffins, results in a significant and unexpected increase in high octane gasoline product as compared to reforming at a pressure greater than about 100 p.s.i.g.

The foregoing description of this invention is not to be considered as limiting since many variations can be made by those skilled in the art without departing from the spirit or scope of the appended claims.

What is claimed is:

1. A low pressure regenerative reforming process of sufficient severity for producing a gasoline of at least 90 F-1 clear octane from a naphtha feed containing at least 50 volume percent paraffins comprising:
   contacting the naphtha feed, hydrogen, and a catalyst comprising a porous inorganic oxide, 0.01 to 3 weight percent platinum, 0.01 to 5 weight percent rhenium, and 0.1 to 3 weight percent halide at reforming conditions including a pressure of less than 100 p.s.i.g., a temperature from 600° F. to 1100° F., a hydrogen to hydrocarbon mole ratio below 6, and a liquid hourly space velocity from 0.5 to 5;
   periodically discontinuing the contacting after a time of less than about 500 hours;
   regenerating the catalyst to substantially restore its initial activity; and then
   continuing the contacting of said hydrogen and catalyst under the reforming conditions.

2. The process of claim 1 wherein the hydrogen to hydrocarbon mole ratio is less than 4.

3. The process of claim 2 wherein the hydrogen to hydrocarbon mole ratio is less than 2.

4. The process of claim 1 wherein catalyst is regenerated at least every 24 hours.

5. The process of claim 1 wherein at least 95 F-1 clear octane gasoline is produced.

6. The process of claim 1 wherein at least 100 F-1 clear octane gasoline is produced.

7. A regenerative process for reforming a naphtha feed containing at least 50 volume percent paraffins which comprises contacting said naphtha in the presence of hydrogen at sufficiently severe reforming conditions to produce a product of at least 90 F-1 clear octane, including a pressure of from 20-100 p.s.i.g., a hydrogen-to-hydrocarbon mole ratio of less than about 6, a liquid hourly space velocity of from 0.5 to 5, a temperature of from 750-1000° F. with a catalyst comprising a porous inorganic oxide carrier associated with from 0.01 to 3 weight percent platinum, 0.01 to 5 weight percent rhenium, and 0.1 to 3 weight percent halide, producing the product of at least 90 F-1 clear octane, continuing the process for a period of time until the activity of said catalyst is substantially impaired and carbonaceous matter is accumulated thereon, said period of time being less than about 500 hours, discontinuing contacting the naphtha-hydrogen mixture with said catalyst, purging said catalyst and subjecting said catalyst to regeneration at a combustion temperature in a range of from 700-1250° F. with a stream of inert gas containing sufficient oxygen to effect combustion of said carbonaceous matter and to restore substantially the initial activity of said catalyst, contacting said catalyst with hydrogen-containing gas and then containing said catalyst with naphtha-hydrogen mixture at reforming conditions.

8. The process of claim 7 wherein said platinum is present in an amount from 0.2 to 1 weight percent and said rhenium is present in an amount from 0.01 to 2 weight percent.

9. The process of claim 7 wherein the hydrogen to hydrocarbon mole ratio is from 0.5 to 4.

(References on following page)

References Cited

UNITED STATES PATENTS

| | | | |
|---|---|---|---|
| 2,838,444 | 6/1958 | Teter et al. | 208—139 |
| 2,863,826 | 12/1958 | Holcomb et al. | 208—138 |
| 2,870,083 | 1/1959 | Elliott | 208—138 |
| 2,952,611 | 9/1960 | Haxton | 208—139 |
| 3,002,918 | 10/1961 | Lang | 208—138 |
| 3,330,761 | 7/1967 | Capsuto et al. | 208—139 |
| 3,434,960 | 3/1969 | Jacobson et al. | 208—138 |

HERBERT LEVINE, Primary Examiner

U.S. Cl. X.R.

208—141

PO-1050
(5/69)

UNITED STATES PATENT OFFICE
CERTIFICATE OF CORRECTION

Patent No. __3,558,479__         Dated __January 26, 1971__

Inventor(s) __ROBERT L. JACOBSON, et al__

It is certified that error appears in the above-identified patent and that said Letters Patent are hereby corrected as shown below:

Col. 6, line 23, "activity" should read --acidity--.

Col. 10, lines 3-5, "The use of the platinum-rhenium catalyst for reforming operation at very low pressures without excessive foul-feeds containing greater than 50 volume percent paraffins," should read --The use of the platinum-rhenium catalyst for reforming at low pressures highly paraffinic feedstocks, that is, feeds containing greater than 50 volume percent paraffins,--

Col. 10, line 66, "containing" should read --contacting--.

Signed and sealed this 24th day of August 1971.

(SEAL)
Attest:

EDWARD M. FLETCHER, JR.
Attesting Officer

WILLIAM E. SCHUYLER, JR.
Commissioner of Patents